United States Patent
Furuya et al.

(10) Patent No.: US 6,461,735 B1
(45) Date of Patent: Oct. 8, 2002

(54) COATED ARTICLE

(75) Inventors: Masahiro Furuya; Yuji Yoshikawa; Satoshi Iwasaki; Masaaki Yamaya; Akira Yamamoto, all of Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/757,474

(22) Filed: Jan. 11, 2001

(30) Foreign Application Priority Data

Jan. 11, 2000 (JP) ........................... 2000-002873

(51) Int. Cl.$^7$ .............................. B32B 9/00; B32B 9/04; C08F 2/22
(52) U.S. Cl. ...................... 428/429; 428/447; 428/448; 428/450; 106/287.1; 524/801; 524/806; 524/849; 524/588
(58) Field of Search .................. 524/800, 801, 524/806, 849, 588; 525/100; 528/10; 428/446, 447, 448, 450, 429; 106/287.1

(56) References Cited

U.S. PATENT DOCUMENTS

| | | |
|---|---|---|
| 3,565,851 A | 2/1971 | Neuroth |
| 4,637,958 A | 1/1987 | Wegehaupt et al. |
| 5,973,068 A | 10/1999 | Yamaya et al. |
| 6,114,440 A | 9/2000 | Yamaya et al. |
| 6,147,156 A  * | 11/2000 | Yamaya et al. ............. 524/588 |

FOREIGN PATENT DOCUMENTS

| | | |
|---|---|---|
| EP | 0 841 355 A2 | 5/1988 |
| EP | 0 285 870 A1 | 10/1988 |
| EP | 0 541 038 A1 | 5/1993 |
| JP | 11-130962 | 5/1999 |

* cited by examiner

Primary Examiner—Robert Dawson
Assistant Examiner—Michael J. Feely
(74) Attorney, Agent, or Firm—Birch, Stewart, Kolasch & Birch, LLP

(57) ABSTRACT

In a coated article comprising an undercoat and an overcoat on a substrate, the undercoat comprising a compound having a hydrolyzable group-bearing silyl group represented by $SiX_{3-a}$ wherein X is a hydrolyzable group and "a" is equal to 0, 1 or 2; and the overcoat is based on a composition comprising a silicone resin-containing emulsion resulting from emulsion polymerization of a mixed solution containing (A-1) a silanol group-bearing silicone resin comprising 30–100 mol % of T units and based on the T units, 30–80 mol % of T-2 units, and having a Mn of at least 500, and (A-2) a radical-polymerizable vinyl monomer. Due to a firm bond between the overcoat and the undercoat, the coated article exhibits a weather and water resistance sufficient to withstand long-term outdoor exposure.

13 Claims, No Drawings

COATED ARTICLE

This invention relates to a coated article comprising substrate, an undercoat and an overcoat sequentially applied onto the substrate, and more particularly, to such a coated article which exhibits a high degree of weather and water resistance sufficient to withstand long-term outdoor exposure, due to a firm bond between the overcoat and the undercoat.

BACKGROUND OF THE INVENTION

From the standpoints of currently much concerned environmental pollution and safe working environment, a need exists in the paint and coating fields to replace organic solvent systems by aqueous systems.

To meet such a demand, emulsion systems resulting from emulsion polymerization of radical-polymerizable vinyl monomers, as typified by acrylic resin systems, are now widely used as the base of coating compositions because of their good film-forming ability and chemical resistance. However, coating compositions of this type essentially lack water resistance and weather resistance.

On the other hand, silicone resins resulting from hydrolytic condensation of silane compounds now draw attention as coating compositions since they are able to form coatings having good physical and chemical properties including a high hardness, weather resistance, water resistance, chemical resistance, heat resistance and water repellency. However, the silicone resins are poor in film-forming ability, alkali resistance and film flexibility and lack storage stability on account of silanol groups having high condensation activity. Additionally, the silicone resins are generally used as solutions in organic solvents, which involve fire and explosion hazards, toxicity to humans, and environmental pollution. A need exists to develop emulsion type compositions.

In order to overcome the above-mentioned drawbacks, U.S. Pat. No. 5,973,068, U.S. Pat. No. 6,114,400 and JP-A 11-130962 disclose coating compositions based on composite emulsions in which a silicone resin is incorporated into an acrylic resin. These compositions form coating possessing both the advantages of silicone and acrylic resins, and especially markedly improved weather resistance. These coatings are thus suitable as topcoats on outdoor buildings, structures and articles which are exposed to sunlight and weather and thus required to have long-term durability.

In such applications subject to long-term outdoor weathering, however, the weather resistance of the coating itself is insufficient and its adhesion to the substrate and undercoat layer, if any, is requisite. The above silicone/acrylic composite resin emulsion coatings have good adhesion to glass, metals and similar materials due to the inclusion of silanol groups or polar groups in the silicone resin, however their adhesion to plastics, organic resins and porous inorganic substrates such as slates is not necessarily satisfactory.

From the past, epoxy base primers have been used in order to improve the adhesion of coatings to substrates. Where the primers are applied to porous brittle surfaces such as those of autoclaved light-weight concrete (ALC) substrates, the coatings are prone to cracking.

Meanwhile, the silicone/acrylic composite resins rich in siloxane component serving as the overcoating agent have coating physical properties largely differing from conventional well-known topcoat resins such as vinyl polymers having hydrolyzable silyl groups on side chains (typically having a silicon content of less than 10%) and essentially fail to establish a firm bond to the underlying substrate.

SUMMARY OF THE INVENTION

An object of the invention is to provide a coated article having improved adhesion between an undercoat layer and an overcoat layer and a high degree of weather and water resistance sufficient to withstand long-term outdoor exposure.

It has been found that by subsequently applying an undercoat agent of a composition (I) having hydrolyzable silyl groups and an overcoat agent of a composition (II) having more silanol groups onto a substrate, a drastically enhanced adhesion is established between the undercoat and the overcoat because silanol groups resulting from hydrolysis of the hydrolyzable silyl groups in composition (I) form siloxane bonds with silanol groups in the composition (II). The coated substrate thus exhibits a high degree of weather resistance and water resistance sufficient to withstand long-term outdoor exposure as well as good coating properties such as heat resistance, water repellency, film-forming ability, mar resistance, and chemical resistance.

The invention provides a coated article comprising a substrate, an undercoat and an overcoat sequentially applied onto the substrate. The undercoat is formed of a composition (I) comprising a compound having a hydrolyzable group-bearing silyl group represented by $SiX_{3-a}$ and/or a partial hydrolyzate thereof, wherein X is a hydrolyzable group and "a" is equal to 0, 1 or 2. The overcoat is formed primarily of a silicone resin-containing emulsion composition (II) comprising a silicone resin-containing emulsion (A). The silicone resin-containing emulsion (A) results from emulsion polymerization of a mixed solution containing (A-1) 100 parts by weight of a silanol group-bearing silicone resin comprising 30 to 100 mol % of structural units (T units) represented by the formula: $R^1$—$SiZ_3$, and based on the entire T units, 30 to 80 mol % of structural units (T-2 units) containing only one silanol group represented by the general formula: $R^1$—$Si(OH)Z'_2$, the silicone resin having a number average molecular weight of at least 500, and (A-2) 10 to 1,000 parts by weight of a radical-polymerizable vinyl monomer. Herein $R^1$ is a substituted or unsubstituted monovalent hydrocarbon group, Z is a hydroxyl group, hydrolyzable group or siloxane residue, at least one of the Z groups being a siloxane residue, and Z' is a siloxane residue.

As a first feature, the coated article has a topcoat or overcoat formed of a silicone/acrylic emulsion composition having the following advantages. (i) In emulsion particles, the silicone resin forms an interpenetrating polymer network (IPN) with the acrylic resin so that both the resins may complement their shortcomings. The emulsion has a good film-forming ability and provides a uniform cured coating having satisfactory properties including mar resistance, weather resistance, and chemical resistance. (ii) In emulsion particles, polymers are intertwined in a solventless state, restricting the freedom of silanol groups which have rich condensation activity. As a consequence, condensation of silanol groups is suppressed even in systems having a high content of silanol groups, contributing to storage stability. Since the silicone resin used are water insoluble, the silicone resin is completely incorporated in particles, so that a satisfactory level of stability is maintained. (iii) Since silanol groups are restrained within emulsion particles, they retain high crosslinking or curing activity until curing, achieving effective cure even at relatively low temperatures. (iv) Because of the substantial absence of solvent, a dry and fully cured coating is obtained. A sound working environment is insured since the volatilization of harmful solvent is eliminated. The emulsion is kept fully stable since it is free of an alcohol component that promotes demulsification.

As a second feature, the coated article has an undercoat of the specific composition having the following advantage below the overcoat of the silicone/acrylic emulsion composition. (v) In the event of substrates having less active groups contributing to adhesion on the surface such as stainless steel and plastics, and porous substrates allowing water to penetrate therethrough such as slates, the interposition of the undercoat layer containing hydrolyzable silyl groups prevents swelling upon immersion in hot water, achieving a significant improvement in adhesion to the substrates.

The coated article, in which the undercoat composition cooperates with the overcoat composition to dramatically improve the adhesion between the undercoat and the overcoat, has a high degree of weather and water resistance sufficient to withstand long-term outdoor exposure as well as excellent coating properties including heat resistance, water repellency, film-forming ability, mar resistance and chemical resistance. The coated article is thus suited as structures and buildings based on substrates of metals, ceramic inorganic materials, glass, wood, paper and plastics and also applicable to a wide variety of uses where acrylic-silicone resins are conventionally employed.

DESCRIPTION OF THE PREFERRED EMBODIMENTS

The coated article of the invention has an undercoat and an overcoat sequentially applied onto a substrate. The substrate is preferably made of metals, ceramic inorganic materials, glass, wood, paper and plastics, but not limited thereto.

Undercoat

The undercoat is formed of a composition (I) comprising a compound having a hydrolyzable group-bearing silyl group represented by $SiX_{3-a}$ wherein X is a hydrolyzable group and "a" is equal to 0, 1 or 2, and/or a partial hydrolyzate thereof.

More particularly, the hydrolyzable groups represented by X are preferably organoxy groups having 1 to 8 carbon atoms, for example, alkoxy, alkenoxy and aryloxy groups containing monovalent hydrocarbon groups such as alkyl groups of 1 to 6 carbon atoms, alkenyl groups and aryl groups. Illustrative, non-limiting examples of the hydrolyzable groups represented by X include methoxy, ethoxy, propoxy, isopropoxy, butoxy, sec-butoxy, t-butoxy, isopropenoxy, and phenoxy groups. Of these, alkoxy groups of 1 to 3 carbon atoms such as methoxy, ethoxy and isopropoxy are preferred for hydrolysis, condensation reaction and storage stability. The letter "a" is equal to 0, 1 or 2, and preferably equal to 0 or 1 for adhesion.

The compound of which the undercoat composition (I) is constructed may have any desired form as long as the above requirements are met. The compound serves to impart an adhesive force. It is believed that silanol groups resulting from hydrolysis of hydrolyzable silyl groups form siloxane bonds with silanol groups which are rich in the overcoat composition, contributing to an improvement in adhesion.

Typical of the undercoat-forming compound are organoxysilanes, especially amino group-bearing alkoxysilanes and partial hydrolyzates thereof, and siloxanes having organoxy groups, especially alkoxy groups, attached to silicon atoms. Also included are the reaction product of a compound having a primary and/or secondary amino group with a compound having an epoxy group with the proviso that at least one of the compounds has at least one $SiX_{3-a}$ group, preferably the reaction product of an organoxysilane having a primary and/or secondary amino group with a compound having an epoxy group, especially an organoxysilane having an epoxy group; a compound having at least one nitrogen atom and bearing at least two $SiX_{3-a}$ groups in a molecule; and a vinyl polymer bearing at least one $SiX_{3-a}$ group in a molecule. A compound having at least one secondary and/or tertiary amino group as the silicon atom-attached organic group is also preferred.

Examples of the reaction product of a primary and/or secondary amino group-bearing compound with an epoxy group-bearing compound include the reaction products of amino group-bearing organosilanes such as γ-aminopropyltrimethoxysilane or N-(2-aminoethyl) aminopropyltrimethoxysilane, with epoxy group-bearing organosilanes such as γ-glycidoxypropyltrimethoxysilane, or non-silicone epoxy compounds such as bisphenol A, epoxy group-bearing acrylic resins and polyester resins.

As a general rule, one primary amino group can react with two epoxy groups. Then the substituent ratio N of epoxy to amino groups is given by the equation:

substituent ratio N=(moles of epoxy groups)/[(moles of primary amino groups multiplied by 2)+(moles of secondary amino groups)].

The substituent ratio N preferably falls in the range of $0.1 \leq N \leq 10$, especially $0.2 \leq N \leq 5$. With N outside the range, there may be available less β-hydroxyamino groups which contribute to adhesion improvement.

Where at least one of the amino group-bearing compound and the epoxy group-bearing compound is an organoxysilane having a hydrolyzable group, it is acceptable to previously add water and an acidic or basic hydrolytic catalyst to the organoxysilane to effect partial hydrolytic condensation, prior to the reaction between amino groups and epoxy groups. Namely, where a hydrolyzable organoxysilane is used, it may be previously converted to a higher molecular weight one by hydrolyzing and condensing the hydrolyzable groups with a certain amount of water in the presence of an acidic or basic hydrolytic catalyst.

The compounds having at least one nitrogen atom and bearing at least two $SiX_{3-a}$ groups in a molecule are typically reaction products of amino group-bearing organoxysilanes with other organoxysilanes, for example, reaction products of the above amino group-bearing organoxysilanes with the above epoxy group-bearing organoxysilanes, dehalogenation reaction products of amino group-bearing organoxysilanes with alkyl halide-bearing organoxysilanes, and Michael addition reaction products of amino group-bearing organoxysilanes with (meth)acrylic group-bearing organoxysilanes.

The compounds having a secondary and/or tertiary amino group as the silicon atom-attached organic group include reaction products of the above amino group-bearing organoxysilanes with other organoxysilanes and dehydrochlorination reaction products of the above amino group-bearing organoxysilanes with dicarboxylic chlorides.

The vinyl polymer having at least one hydrolyzable silyl group in a molecule is preferably a vinyl copolymer resulting from copolymerization of a mixture of vinyl polymerizable monomers containing 0.1 to 20% by weight of a vinyl polymerizable, functional group-bearing hydrolyzable silane represented by the following formula.

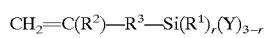

$CH_2=C(R^2)-R^3-Si(R^1)_r(Y)_{3-r}$

Herein $R^1$ is a substituted or unsubstituted monovalent hydrocarbon group, preferably of 1 to 10 carbon atoms, for example, alkyl groups such as methyl, ethyl, propyl, isopropyl, butyl, t-butyl, hexyl, cyclohexyl, octyl and decyl; alkenyl groups such as vinyl, allyl, 5-hexenyl and 9-decenyl; aryl groups such as phenyl; and substituted ones of the foregoing groups in which some or all of the hydrogen atoms are replaced by halogen atoms such as fluoro, bromo or chloro, cyano groups, hydroxyl groups or the like.

$R^2$ is hydrogen or methyl. $R^3$ is a divalent organic group, such as alkylene, arylene, and alkylene arylene groups of 1 to 10 carbon atoms which may be separated by an oxygen atom, —COO— or another intervening group. Y is a hydrolyzable group as described above. The letter r is equal to 0, 1 or 2.

Illustrative, non-limiting examples of the vinyl polymerizable, functional group-bearing hydrolyzable silane include radical polymerizable, functional group-bearing silane compounds such as vinyltrimethoxysilane, vinyltriethoxysilane, vinylmethyldimethoxysilane, vinylmethyldiethoxysilane, 5-hexenyltrimethoxysilane, 3-(meth)acryloxypropyltrimethoxysilane, 3-(meth)acryloxy-propyltriethoxysilane, 3-(meth)acryloxypropylmethyl-dimethoxysilane, 3-(meth)acryloxypropylmethyldiethoxysilane, 4-vinylphenyltrimethoxysilane, 3-(4-vinylphenyl)-5 propyltrimethoxysilane, and 4-vinylphenylmethyltrimethoxy-silane.

The other vinyl polymerizable monomers to be copolymerized with the hydrolyzable silane are not critical as long as they are radical polymerizable. Conventional well-known monomers belonging to classes (a) through (m) below are useful and they may be used alone or in admixture.

(a) Alkyl (meth)acrylates whose alkyl moiety has 1 to 18 carbon atoms, for example, methyl, ethyl, propyl, isopropyl, butyl, isobutyl, octyl, 2-ethylhexyl, lauryl, stearyl and cyclohexyl esters of acrylic acid or methacrylic acid.

(b) Vinyl monomers containing carboxyl group or anhydride thereof, such as acrylic acid, methacrylic acid and maleic anhydride.

(c) Hydroxyl group-bearing vinyl monomers such as 2-hydroxyethyl (meth)acrylate and 2-hydroxypropyl (meth) acrylate.

(d) Amide group-bearing vinyl monomers such as (meth) acrylamide, N-methylol (meth)acrylamide, N-methoxymethyl (meth)acrylamide, N-butoxymethyl (meth)acrylamide, and diacetone (meth)acrylamide.

(e) Amino group-bearing vinyl monomers such as dimethylaminoethyl (meth)acrylate and diethylaminoethyl (meth)acrylate.

(f) Alkoxyl group-bearing vinyl monomers such as methoxyethyl (meth)acrylate and butoxyethyl (meth)acrylate.

(g) Glycidyl group-bearing vinyl monomers such as glycidyl (meth)acrylate and glycidyl allyl ether.

(h) Vinyl ester monomers such as vinyl acetate and vinyl propionate.

(i) Aromatic vinyl monomers such as styrene, vinyltoluene and α-methylstyrene.

(j) Vinyl cyanide monomers such as (meth)acrylonitrile.

(k) Vinyl halide monomers such as vinyl chloride and Vinyl bromide.

(l) Vinyl monomers containing at least two radical polymerizable, unsaturated groups in a molecule such as divinyl benzene, allyl (meth)acrylate, ethylene glycol di(meth)acrylate, diethylene glycol di(meth)acrylate, and trimethylolpropane tri(meth)acrylate.

(m) (Poly)oxyethylene chain-containing vinyl monomers such as (poly)oxyethylene mono(meth)acrylates in which the number of ethylene oxide groups is 1 to 100.

As long as the above-described compound is contained, the undercoat composition (I) may take any desired form, for example, a solution in an organic solvent, an emulsion dispersed in water, and an aqueous solution if the compound is water soluble.

Overcoat

The overcoat is made of an overcoat composition (II) based on a silicone resin-containing emulsion composition comprising a silicone resin-containing emulsion. The silicone resin-containing emulsion results from emulsion polymerization of a mixed solution containing (A-1) 100 parts by weight of a silanol group-bearing silicone resin comprising 30 to 100 mol % (based on the silicone resin) of structural units (T units) represented by the formula: $R^1$—$SiZ_3$, and based on the entire T units, 30 to 80 mol % of structural units (T-2 units) containing only one silanol group represented by the general formula: $R^1$—Si(OH)$Z'_2$, wherein $R^1$ is a substituted or unsubstituted monovalent hydrocarbon group, Z is a hydroxyl group, hydrolyzable group or siloxane residue, at least one of the Z groups being a siloxane residue, and Z' is a siloxane residue, the silicone resin having a number average molecular weight of at least 500, and (A-2) 10 to 1,000 parts by weight of a radical-polymerizable vinyl monomer.

The silanol group-bearing silicone resin (A-1) contains structural units (T units) represented by the formula: $R^1$—$SiZ_3$ and structural units (T-2 units) containing only one silanol group represented by the general formula: $R^1$—Si(OH)$Z'_2$.

In the formulas, $R^1$ is a substituted or unsubstituted monovalent hydrocarbon group as described previously, with methyl, propyl, hexyl, and phenyl being preferred. Methyl is preferred especially when weather resistance is required. Long-chain alkyl groups are preferred especially when water repellency is required. Phenyl is preferred especially when flexibility is imparted to the coating. It is preferred that methyl accounts for at least 50 mol %, and especially at least 80 mol % of the entire organic substituents.

The substituted monovalent hydrocarbon groups correspond to the foregoing unsubstituted monovalent hydrocarbon groups of 1 to 10 carbon atoms in which some or all of the hydrogen atoms are replaced by substituents. Exemplary substituents include (1) halogen atoms such as fluorine and chlorine, (2) epoxy functional groups such as glycidyloxy and epoxycyclohexyl groups, (3) (meth)acrylic functional groups such as methacrylic and acrylic groups, (4) amino functional groups such as amino, aminoethylamino, phenylamino and dibutylamino groups, (5) sulfurous functional groups such as mercapto and tetrasulfide groups, (6) alkyl ether functional groups such as (polyoxyalkylene) alkyl ether groups, (7) anionic groups such as carboxyl and sulfonyl groups, and (8) quaternary ammonium salt structure-bearing groups.

Illustrative, non-limiting, examples of the substituted monovalent hydrocarbon groups include trifluoropropyl, perfluorobutylethyl, perfluorooctylethyl, 3-chloropropyl, 2-(chloromethylphenyl)ethyl, 3-glycidyloxypropyl, 2-(3,4-epoxycyclohexyl)ethyl, 5,6-epoxyhexyl, 9,10-epoxydecyl, 3-(meth)acryloxypropyl, (meth)acryloxymethyl, 11-(meth) acryloxyundecyl, 3-aminopropyl, N-(2-aminoethyl) aminopropyl, 3-(N-phenylamino)propyl, 3-dibutylaminopropyl, 3-mercaptopropyl, 2-(4-mercaptomethylphenyl)ethyl, polyoxyethylenoxypropyl, 3-hydroxycarbonylpropyl, and 3-tributylammonium propyl groups.

Epoxy, amino or mercapto functional groups may be employed where it is desired to enhance the adhesion to substrates. (Meth)acrylic functional groups capable of radical copolymerization or mercapto functional groups having the function of a chain transfer agent are preferably employed where it is desired to form a tight block with the vinyl polymer. On an attempt of crosslinking with the vinyl polymer through bonds other than siloxane bonds, it is effective to introduce a functional group capable of reaction with organic functional groups in the vinyl polymer, for example, epoxy groups (for reaction with hydroxy, amino, carboxy and other groups) and amino groups (for reaction with epoxy, acid anhydride and other groups).

In the above formulas, Z is a hydroxyl (OH) group, hydrolyzable group or siloxane residue, and Z' is a siloxane residue. Illustrative, non-limiting examples of the hydrolyzable groups represented by Z include alkoxy groups such as methoxy, ethoxy, propoxy, isopropoxy, butoxy, sec-butoxy, and t-butoxy, alkenoxy groups such as isopropenoxy, phenoxy groups, acyloxy groups such as acetoxy, oxime groups such as butanoxime, and amino groups. Of these, alkoxy groups are preferred, and methoxy, ethoxy, isopropoxy and butoxy are especially preferred for easy control of hydrolytic condensation.

T units of the formula: $R^1$—$SiZ_3$ are structural units that substantially govern the crosslinking and curing properties of silicone resin, and are contained in an amount of 30 to 100 mol %. Too low a content of T units results in a coating with low hardness and undercure. In order that the silicone resin be evenly interlocked with the vinyl polymer within emulsion particles to restrict the freedom of active silanol groups, the silicone resin must be more structured. The preferred T unit content is in the range of 50 to 100 mol % because the silicone resin becomes more rigid and shelf stable.

T-2 units containing only one silanol group represented by the formula: $R^1$—$Si(OH)Z'_2$ mean to have siloxane residues represented by Z' and a substituent which bonds to an adjacent silicon atom via an oxygen atom to form a siloxane bond, and thus take the form of —O—Si≡. The oxygen atom is represented as $O_{1/2}$ since it is shared by adjacent silicon atoms. Then, T-2 unit can be represented as $R^1$—Si(OH)$O_{2/2}$ since it contains two $O_{1/2}$.

In order that the cured coating have a desired hardness, the silicone resin must contain the predetermined amount of T units. In order to impart flexibility to the cured coating while maintaining satisfactory curability and mutual miscibility with the vinyl polymer being formed within particles, the silicone resin should contain 30 to 80 mol %, and especially 35 to 70 mol % of T-2 units based on the entire T units. At too low a T-2 unit content, the absolute amount of silanol groups contributing to the cure of silicone resin becomes short so that the coating may become undercured. On the other hand, a too high T-2 unit content has problems that the degree of polymerization must be controlled low, a chain-like or cyclic structure is unlikely to form at a low degree of polymerization, the cured coating becomes highly crystalline and less flexible, and storage stability is lost because of the increased freedom of silanol groups within particles.

Other constituent units may be included. The silicone resin may additionally contain 0 to 10 mol % of M units of the formula: $R^1_3SiZ$ (with the proviso that Z in M units is a siloxane residue), 0 to 50 mol % of D units of the formula: $R^1_2SiZ_2$, and/or 0 to 30 mol % of Q units of the formula: $SiZ_4$.

Reference is now made to the number average molecular weight (Mn) of the silanol group-bearing silicone resin (A-1). The silicone resin must be structured in order to acquire the above-mentioned properties. To provide the predetermined structure, the silicone resin must have a high molecular weight above a certain level. For this reason, a silicone resin having a Mn of at least 500 is used in the practice of the invention. The preferred Mn is at least 1,000. The upper limit of Mn is not critical although it is usually about 50,000. Too low an Mn fails to impart an appropriate structure and flexibility and leads to storage instability.

The silicone resin which can be used herein satisfies the above requirements and should preferably contain at least an amount of silanol groups. Specifically, the silicone resin preferably contains at least 5% by weight, and especially 6 to 20% by weight or more of silanol groups. At too low a silanol group content, the absolute amount of silanol groups effective for crosslinking becomes short so that the coating may have a reduced hardness.

The silanol group-bearing silicone resin (A-1) may be prepared by any desired method as long as the above requirements are met. Specific preparation methods are described below.

The starting reactant used for preparation may be selected from a variety of hydrolyzable silane compounds having hydrolyzable groups such as alkoxy, acyloxy, chloro, amino and oxime groups, or partial hydrolytic condensates thereof. For easy control of hydrolytic reaction or easy disposal of hydrolytic by-products and from the economic standpoint, it is preferred to use alkoxy or chloro groups as the hydrolyzable group. The number of hydrolyzable groups per silicon atom may be 1, 2, 3 or 4. Any of silane compounds having organic substituents and satisfying the above requirements can be used.

Illustrative examples of the silane compound used herein include tetrachlorosilane, tetramethoxysilane, tetraethoxysilane, tetrabutoxysilane, methyltrichlorosilane, methyltrimethoxysilane, methyltriethoxysilane, methyltriisopropoxysilane, methyltributoxysilane, methyltriisopropenoxysilane, dimethyldichlorosilane, dimethyldimethoxysilane, dimethyldiethoxysilane, dimethyldiisopropoxysilane, dimethyldibutoxysilane, dimethyldiisopropenoxysilane, trimethylchlorosilane, trimethylmethoxysilane, trimethylethoxysilane, trimethylisopropenoxysilane, ethyltrichlorosilane, ethyltrimethoxysilane, propyltrichlorosilane, butyltrichlorosilane, butyltrimethoxysilane, hexyltrichlorosilane, hexyltrimethoxysilane, decyltrichlorosilane, decyltrimethoxysilane, phenyltrichlorosilane, phenyltrimethoxysilane, cyclohexyltrichlorosilane, cyclohexyltrimethoxysilane, propylmethyldichlorosilane, propylmethyldimethoxysilane, hexylmethyldichlorosilane, hexylmethyldimethoxysilane, phenylmethyldichlorosilane, phenylmethyldimethoxysilane, diphenyldichlorosilane, diphenyldimethoxysilane, and dimethylphenylchlorosilane; silane coupling agents having organic functional groups such as vinyltrichlorosilane, vinyltrimethoxysilane, vinyltriethoxysilane, vinylmethyldichlorosilane, vinylmethyldimethoxysilane, vinylmethyldiethoxysilane, 5-hexenyltrimethoxysilane, 3-glycidoxypropyltrimethoxysilane, 3-glycidoxypropyltriethoxysilane, 3-glycidoxypropylmethyldimethoxysilane, 3-glycidoxypropylmethyldiethoxysilane, 3-(meth)acryloxypropyltrimethoxysilane, 3-(meth)acryloxypropyltriethoxysilane, 3-(meth)acryloxypropylmethyldimethoxysilane, 3-(meth)acryloxypropylmethyldiethoxysilane, 4-vinylphenyltrimethoxysilane, 3-(4-vinylphenyl)

propyltrimethoxysilane,
4-vinylphenylmethyltrimethoxysilane,
3-aminopropyltrimethoxysilane,
3-aminopropyltriethoxysilane,
3-aminopropylmethyldimethoxysilane,
3-aminopropylmethyldiethoxysilane, 3-(2-aminoethyl) aminopropyltrimethoxysilane,
3-mercaptopropyltrimethoxysilane,
3-mercaptopropyltriethoxysilane,
3-mercaptopropylmethyldimethoxysilane,
3-mercaptopropylmethyldiethoxysilane, and partial hydrolyzates thereof. They may be used alone or in admixture of two or more. For ease of operation and distilling off of by-products, use of methoxysilanes or ethoxysilanes is more preferred. Of course, the organosilicon compound which can be used herein is not limited to these examples.

A method of hydrolyzing the hydrolyzable silane compound for producing the silicone resin which can be used herein is embodied by the invention. The silanol group-bearing silicone resin which can be used herein is characterized in that it is obtained by hydrolyzing a hydrolyzable silane compound in an aqueous solution. By effecting hydrolysis under hydrophilic conditions substantially free of an organic solvent, there is obtained a specific silanol group-bearing silicone resin (A-1) which is highly structured and contains a significant amount of T-2 units. This silicone resin is preferably prepared by the following steps.

A first step is to subject a hydrolyzable organic silane compound as mentioned above to hydrolytic condensation in an aqueous solution at pH 1 to 7. The amount of water used for hydrolysis may be about 50 to 5,000 parts by weight per 100 parts by weight of the silane compound or mixture thereof formulated to a composition satisfying the above requirements. Less than 50 parts means a too small amount of water in the reaction system so that it is difficult to control the reactivity of silanol groups, failing to impart a specific structure. In excess of 5,000 parts of water, the concentration of the silane reactant becomes too low and may retard condensation reaction.

Hydrolysis is carried out by adding the silane compound to an aqueous solution, followed by agitation. A hydrolytic catalyst may be added to promote hydrolysis, especially at the initial. The hydrolytic catalyst may be added to either the aqueous solution prior to the addition of the silane compound or the dispersion having the silane compound dispersed therein. A suitable hydrolytic catalyst is selected from conventional well-known catalysts, preferably those catalysts which exhibit an acidity of pH 1 to 7 when added to an aqueous solution. Preferred catalysts are acidic hydrogen halides, carboxylic acids, sulfonic acids, acidic or weakly acidic inorganic salts, and solid acids such as ion exchange resins. Illustrative examples are hydrofluoric acid, hydrochloric acid, nitric acid, sulfuric acid, organic acids such as acetic acid and maleic acid, methylsulfonic acid, and cationic resins having sulfonic acid or carboxylic acid groups on the surface.

The amount of the hydrolytic catalyst used is preferably in a range of 0.001 to 10 mol % based on the moles of hydrolyzable groups on silicon atoms. Under strongly acidic conditions below pH 1 or under alkaline conditions above pH 7, silanol groups tend to become quite unstable. More preferably, the aqueous solution is adjusted to pH 2 to 6. The amount of water is in large excess relative to the amount of hydrolyzable groups, and so hydrolysis proceeds to completion. As the solution is agitated under the above conditions and at room temperature or elevated temperature, condensation readily takes place between silanol groups. At this stage, hydrolytic by-products are present in the system, and the silane reaction mixture serving as a precursor of the desired silanol group-bearing silicone resin is kept dissolved in the solution.

A second step is to remove the hydrolytic by-products from the solution of the reaction mixture for yielding a system consisting essentially of the desired silanol group-bearing silicone resin and water. Specifically, the solution containing the silane reaction mixture resulting from the first step is heated at a temperature below about 80° C., especially about 30 to 70° C. under atmospheric pressure, or kept or heated at a temperature in the range from room temperature to about 80° C. under a pressure in the range from 20 mmHg to atmospheric pressure, whereby the hydrolytic by-products such as alcohols are distilled off. In this way, the system is converted into a system consisting essentially of the desired silanol group-bearing silicone resin and water. During the step, the silicone resin further increases a degree of condensation and is more structured at the same time. The silicone resin, which has been grown in a somewhat straight-chain manner in the first step, converts in to a higher molecular weight one and gradually loses hydrophilicity with the progress of condensation. The external environment in which the silicone resin is dissolved becomes almost water. Since the silicone resin has energy preference in keeping water solubility or dispersibility, it tends to assume the state that hydrophilic silanol groups are oriented in the outside water layer. The consequence is the silicone resin which contains a major amount of silanol groups, which are T-2 units forming a straight-chain structure contributing to flexibility, and has grown to a sufficient level to impart flexibility. Heating above 80° C. is undesirable because condensation of once formed T-2 units can take place, converting to non-crosslinkable T-3 units ($R^1$—$SiO_{3/2}$). Therefore, to retain the T-2 units having condensation activity, it is recommended to carry out heating and distillation at as low a temperature as possible. Upon removal of 30 to 100% of the hydrolytic by-products formed, the silanol group-bearing silicone resin cannot keep dissolved in the solution, and so the solution becomes faintly or white turbid. If the amount of the hydrolytic by-products removed is less than 30%, the growth of the silicone resin may become insufficient. The more preferred amount of the hydrolytic by-products removed is 50 to 100%. Now that the silicone resin has turned to be insoluble in the water layer, it settles down when allowed to stand.

In a third step, the thus obtained silicone resin is dissolved in a polymerizable vinyl monomer and the vinyl monomer solution of the silicone resin is separated from the water layer. At this point, the majority of the residual hydrolytic by-products which are fully water soluble remain dissolved in the water layer, and they are separated and removed from the silicone resin. In order to ensure the stability of the end emulsion, the permissible amount of hydrolytic by-products (such as alcohols) entrained on the silicone resin should be less than about 10% by weight, more preferably less than 5% by weight of the vinyl monomer solution. If the removal of hydrolytic by-products is insufficient, they are removed by further water washing. In this way, there is obtained the polymerizable vinyl monomer solution having the silicone resin dissolved therein which is substantially free of an organic solvent.

Reference is now made to the radical polymerizable vinyl monomer (A-2). The vinyl monomers used herein are not critical as long as they are radical polymerizable. Conventional well-known monomers belonging to classes (a) through (o) below are useful and they may be used alone or in admixture.

(a) Alkyl (meth)acrylates whose alkyl moiety has 1 to 18 carbon atoms, for example, methyl, ethyl, propyl, isopropyl, butyl, isobutyl, octyl, 2-ethylhexyl, lauryl, stearyl and cyclohexyl esters of acrylic acid or methacrylic acid.

(b) Vinyl monomers containing carboxyl group or anhydride thereof, such as acrylic acid, methacrylic acid and maleic anhydride.

(c) Hydroxyl group-bearing vinyl monomers such as 2-hydroxyethyl (meth)acrylate and 2-hydroxypropyl (meth)acrylate.

(d) Amide group-bearing vinyl monomers such as (meth)acrylamide, N-methylol (meth)acrylamide, N-methoxymethyl (meth)acrylamide, N-butoxymethyl (meth)acrylamide, and diacetone (meth)acrylamide.

(e) Amino group-bearing vinyl monomers such as dimethylaminoethyl (meth)acrylate and diethylaminoethyl (meth)acrylate.

(f) Alkoxyl group-bearing vinyl monomers such as methoxyethyl (meth)acrylate and butoxyethyl (meth)acrylate.

(g) Glycidyl group-bearing vinyl monomers such as glycidyl (meth)acrylate and glycidyl allyl ether.

(h) Vinyl ester monomers such as vinyl acetate and vinyl propionate.

(i) Aromatic vinyl monomers such as styrene, vinyltoluene and α-methylstyrene.

(j) Vinyl cyanide monomers such as (meth)acrylonitrile.

(k) Vinyl halide monomers such as vinyl chloride and vinyl bromide.

(l) Vinyl monomers containing at least two radical polymerizable, unsaturated groups in a molecule such as divinyl benzene, allyl (meth)acrylate, ethylene glycol di(meth)acrylate, diethylene glycol di(meth)acrylate, and trimethylolpropane tri(meth)acrylate.

(m) (Poly)oxyethylene chain-containing vinyl monomers such as (poly)oxyethylene mono(meth)acrylates in which the number of ethylene oxide groups is 1 to 100.

(n) Diorganopolysiloxanes including 1 to 200 siloxane units and having a radical polymerizable functional group at one end, such as dimethylpolysiloxane having a (meth)acryloxypropyl group at one end, and dimethylpolysiloxane having a styryl or α-methylstyryl group at one end.

(o) Vinyl polymerizable, functional group-bearing hydrolyzable silanes of the general formula:

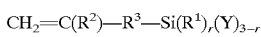

wherein $R^1$, $R^2$, $R^3$, Y, and r are as defined previously. Illustrative, non-limiting examples of the silane (o) include radical polymerizable, functional group-bearing silane compounds such as vinyltrimethoxysilane, vinyltriethoxysilane, vinylmethyldimethoxysilane, vinylmethyldiethoxysilane, 5-hexenyltrimethoxysilane, 3-(meth)acryloxypropyltrimethoxysilane, 3-(meth)acryloxypropyltriethoxysilane, 3-(meth)acryloxypropylmethyldimethoxysilane, 3-(meth)acryloxypropylmethyldiethoxysilane, 4-vinylphenyltrimethoxysilane, 3-(4-vinylphenyl)-propyltrimethoxysilane, and 4-vinylphenylmethyltrimethoxysilane.

Of these vinyl monomers, the $C_{1-18}$ alkyl (meth)acrylates (a) and the vinyl polymerizable, functional group-bearing hydrolyzable silanes (o) are preferred. An appropriate amount of the $C_{1-18}$ alkyl (meth)acrylate is 1 to 100 mol %, more preferably 30 to 99 mol % of the entire radical polymerizable vinyl monomers as component (A-2). Too small an amount of the $C_{1-18}$ alkyl (meth)acrylate may fail to provide the desired properties such as chemical resistance. An appropriate amount of the vinyl polymerizable, functional group-bearing hydrolyzable silane is 0.01 to 10 mol % of the entire radical polymerizable vinyl monomers as component (A-2). With less than 0.01 mol % of the hydrolyzable silane, crosslinking with the silicone resin may become insufficient. With more than 10 mol % of the hydrolyzable silane, the cured coating may become too hard and less flexible.

Where it is desired to impart solvent resistance or chemical resistance to the cured coating, it is recommended to copolymerize a radical polymerizable vinyl monomer having a crosslinkable functional group, especially a silane compound having a radical polymerizable functional group capable of forming siloxane bonds through condensation reaction as set forth above in class (o) or a compound having a carboxylic acid group and an epoxy functional group capable of crosslinking through ring-opening reaction of epoxy groups, typically glycidyl group-containing vinyl monomers such as glycidyl (meth)acrylate and glycidyl allyl ether as set forth above in class (g). Since the counterpart is the silanol group-bearing silicone resin, the use of silane compounds is more appropriate. Also, where it is desired to impart lubricity to the surface, it is recommended to copolymerize a diorganopolysiloxane having a radical polymerizable functional group at one end as set forth above in class (n).

An appropriate amount of the radical polymerizable vinyl monomer (A-2) used is about 10 to 1,000 parts by weight per 100 parts by weight of the silanol group-bearing silicone resin (A-1). With too small an amount of the radical polymerizable vinyl monomer, film-forming ability and chemical resistance become insufficient. With too large an amount of the radical polymerizable vinyl monomer, the coating lacks weather resistance and water resistance. The more preferred amount of the radical polymerizable vinyl monomer (A-2) used is about 30 to 500 parts by weight.

By subjecting a mixed solution containing the silanol group-bearing silicone resin (A-1) and the radical polymerizable vinyl monomer (A-2) to emulsion polymerization, there is obtained the silicone resin-containing emulsion (A). The method employed for emulsion polymerization in one preferred embodiment of the invention involves the steps of:

(i) hydrolyzing a hydrolyzable silane compound in an aqueous solution at pH 1 to 7, to form a reaction mixture containing a silanol group-bearing silicone resin, (ii) removing hydrolytic by-products from the reaction mixture and leaving a system essentially containing the silanol group-bearing silicone resin in water, (iii) adding a radical-polymerizable vinyl monomer to the system essentially containing the silanol group-bearing silicone resin in water and dissolving the monomer in the system, and removing a layer consisting of residual hydrolytic by-products and water, and (iv) emulsion polymerizing the resulting solution of the silicone resin in the radical-polymerizable vinyl monomer in the presence of a surfactant.

Steps (i), (ii) and (iii) are as previously described. In step (iv), the radical-polymerizable vinyl monomer solution of the silicone resin obtained in step (iii) after removal of hydrolytic by-product and water is subjected to emulsion polymerization in the presence of a surfactant.

The surfactant used for effecting emulsion polymerization may be selected from conventional well-known surfactants including nonionic, cationic and anionic surfactants, and reactive emulsifiers having a radical polymerizable functional group.

More illustratively, useful surfactants include nonionic surfactants such as polyoxyethylene alkyl ethers, polyoxyethylene alkyl phenyl ethers, polyoxyethylene carboxylates, sorbitan esters, and polyoxyethylene sorbitan esters; cationic surfactants such as alkyltrimethylammonium chlorides and alkylbenzylammonium chlorides; anionic surfactants such as alkyl or alkylallyl sulfates, alkyl or alkylallyl sulfonates, and dialkylsulfosuccinates; and ampholytic surfactants such as amino acid type and betaine type surfactants. Also useful are reactive surfactants including such derivatives as radical polymerizable (meth)acrylate, styrene and maleate compounds containing in a molecule a hydrophilic group such as a sulfonic acid salt, polyoxyethylene chain, or quaternary ammonium salt, as described in JP-A 8-27347. These surfactants are exemplified below.

(1)

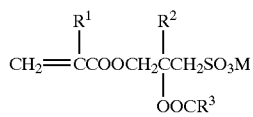

$R^1$, $R^2$: H, $CH_3$
$R^3$: $C_{7-21}$alkyl, alkenyl
M: alkali metal, ammonium
(see JP-A 54-144317)

(2)

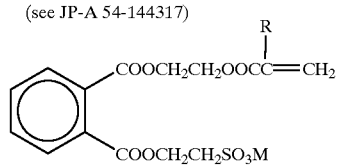

R: H, $CH_3$
M: alkali metal, ammonium, amine
(see JP-A 55-115419)

(3)

R: H, $CH_3$
A: alkylene
n: integer of at least 2
M: mono- or divalent cation
(see JP-A 62-34947)

(4)

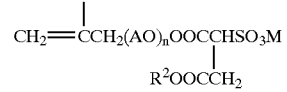

$R^1$: H, $CH_3$
$R^2$: substituted or unsubstituted hydrocarbon, etc.
A: $C_{2-4}$alkylene, substituted alkylene
n: 0, positive number
(see JP-B 49-46291)

(5)

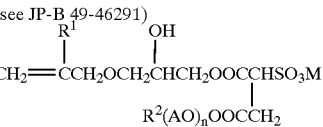

$R^1$: H, $CH_3$
$R^2$: substituted or unsubstituted hydrocarbon, amino, etc.
A: $C_{2-4}$alkylene
n: 0–100
M: mono- or divalent cation
(see JP-A 58-203960)

(6)

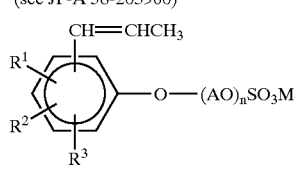

$R^1$: $C_{6-18}$alkyl etc.
$R^2$: H, $C_{6-18}$alkyl, etc.
$R^3$: H, propenyl
A: $C_{2-4}$alkylene, substituted alkylene
M: alkali metal, etc.
N: 1–200
(see JP-A 4-53802)

-continued (7)

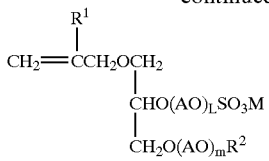

$R^1$: H, $CH_3$
$R^2$: $C_{8-24}$hydrocarbon, etc.
A: $C_{2-4}$alkylene
M: H, alkali metal, alkaline earth metal, etc.
L: 0–20
m: 0–50
(see JP-A 62-104802)

(8)

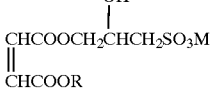

R: $C_{8-22}$hydrocarbon
M: alkali metal, ammonium salt
(see JP-A 49-40388)

(9)

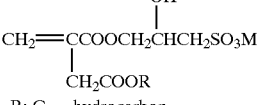

R: $C_{8-22}$hydrocarbon
M: alkali metal, ammonium salt
(see JP-A 49-40388)

(10)

R: alkyl, alkylphenyl
A: ethylene
M: ammonium, amine, alkali metal
m: 9, 12, 14, 28
(see JP-A 52-134658)

(11)

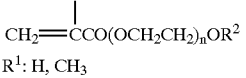

$R^1$: H, $CH_3$
$R^2$: H, $CH_3$, —$C_6H_4$—$(CH_2)_{\overline{m}}$—H
n: 4–30
(see JP-A 53-126093)

(12)

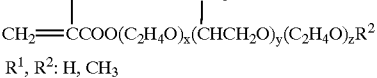

$R^1$, $R^2$: H, $CH_3$
x: 0–100
y: 0–100
z: 0–100
$1 \leq x+y+z \leq 100$
(see JP-A 56-28208

(13)

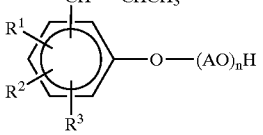

$R^1$: $C_{6-18}$alkyl, etc.
$R^2$: H, $C_{6-18}$alkyl, etc.
$R^3$: H, propenyl
A: $C_{2-4}$alkylene, substituted alkylene
n: 1–200
(see JP-A 4-50204)

-continued

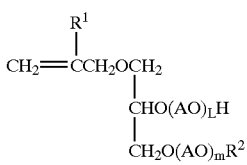
(14)

R$^1$: H, CH$_3$
R$^2$: C$_{6-24}$hydrocarbon, acyl
A: C$_{2-4}$alkylene
L: 0–100
m: 0–50
(see JP-A 62-104802)

$$CH_2{=}CCOO(A^1O)_mR^1 \atop (CH_2)_LCOO(A^2O)_nR^2 \qquad (15)$$

R$^1$, R$^2$: H, C$_{6-24}$hydrocarbon, acyl
A$^1$, A$^2$: C$_{2-4}$alkylene, substituted alkylene
L: 1, 2
m, n: 0, positive number, m + n ≥ 3,
    m + n ≥ 1 when R$^1$ and R$^2$ are H
(see JP-A 50-98484)

These surfactants may be used alone or in admixture. An appropriate amount of the surfactant used is about 0.5 to 15% by weight, especially about 1 to 10% by weight based on the total of effective components, i.e., components (A-1) and (A-2) combined. From the standpoint of enhancing the stability of the emulsion, it is preferred to use the reactive surfactant as part or the entirety of the surfactants used.

For emulsion polymerization, a radical polymerization initiator is often used. Examples of the polymerization initiator include persulfates such as potassium persulfate and ammonium persulfate; water-soluble initiators such as hydrogen peroxide, t-butylhydroperoxide, t-butylperoxymaleic acid, succinic acid peroxide, and 2,2'-azobis(2-N-benzylamidino)propane hydrogen chloride; oil-soluble initiators such as benzoyl peroxide, cumenehydroperoxide, dibutyl peroxide, diisopropylperoxydicarbonate, cumylperoxyneodecanoate, cumylperoxyoctoate, and azoisobutyronitrile; and redox initiators combined with reducing agents such as acidic sodium sulfite, Rongalit and ascorbic acid. An appropriate amount of the polymerization initiator used is about 0.1 to 10% by weight, especially about 0.5 to 5% by weight based on the radical polymerizable vinyl monomer (A-1).

When the radical polymerizable vinyl monomer solution having the silanol group-bearing silicone resin dissolved therein, obtained by the above method, is emulsion polymerized using the above surfactant and polymerization initiator, any of conventional well-known methods may be employed for emulsion polymerization. Useful methods are a batchwise method of emulsifying the entire vinyl monomer solution, followed by polymerization, and a monomer replenishment method of continuously replenishing the vinyl monomer solution or emulsion while effecting polymerization, a seed polymerization method of previously polymerizing part of the emulsion and then replenishing the reminder of the emulsion while effecting polymerization, and a core/shell polymerization method of forming the core and the shell from different monomer compositions, but not limited thereto. Any of these methods may be used because they can suppress condensation of highly active silanol groups.

The silicone resin-containing emulsion (A) thus obtained is substantially free of any of flammable organic solvents having a boiling point of lower than 100° C., aromatic organic solvents harmful to humans, and organic solvents non-dispersible (or insoluble) in water.

Also included in the overcoat composition (II) used in the preferred embodiment of the invention is a film-forming ingredient as component (B).

The film-forming ingredient or aid (B) is soluble in water and functions to maintain a high degree of leveling in such a way that it is left in the coating even after the majority of water is evaporated off, and imparts fluidity to the coating until the completion of curing. The film-forming ingredient is effective particularly when the resulting acrylic polymer has a high glass transition temperature. All water-soluble ingredients having a boiling point of higher than 100° C. are included. Illustrative, non-limiting, examples include alcohols such as 1-butanol, isobutyl alcohol, 2-pentanol, 3-pentanol, isopentyl alcohol, methyl lactate, ethyl lactate, and 3-methyl-3-methoxybutanol; polyols such as 1,2-propane diol, 1,3-butane diol, 1,4-butane diol, 2,3-butane diol, 1,5-pentane diol, 2-methyl-2,4-pentane diol, glycerin, and trimethylol propane; ethylene glycol derivatives such as 2-butoxyethanol, 2-phenoxyethanol, 2-ethoxyethyl acetate, 2-butoxyethyl acetate, diethylene glycol monobutyl ether acetate; propylene glycol derivatives such as 1-methoxy-2-propanol, 1-ethoxy-2-propanol, 1-methoxy-2-methylethyl acetate, 1-ethoxy-2-methylethyl acetate, dipropylene glycol, dipropylene glycol monomethyl ether, dipropylene glycol monoethyl ether, and dipropylene glycol monomethyl ether acetate; butylene glycol derivatives such as 3-methoxybutyl acetate; ketones such as cyclohexanone; and esters such as butyl acetate, isobutyl acetate, γ-butyrolactone, propylene carbonate, and dibutyl phthalate. Of these, 2-ethoxyethyl acetate, 2-butoxyethyl acetate, diethylene glycol monobutyl ether acetate, 1-ethoxy-2-methylethyl acetate, and dipropylene glycol monomethyl ether acetate are preferred for leveling. Since these organic solvents are less soluble in water than low-boiling alcohols such as methanol and ethanol, they do not detract from the emulsion stability, and contribute to only the formation of a uniform coating.

The film-forming ingredient (B) performs equally either when it is added to the vinyl monomer solution prior to emulsion polymerization or when it is added to the emulsion following emulsion polymerization. An appropriate amount of the film-forming ingredient (B) used is 0 to about 20 parts, more preferably about 1 to 20 parts, and most preferably about 5 to 15 parts by weight per 100 parts by weight of the silanol group-bearing silicone resin (A-1) and radical polymerizable vinyl monomer (A-2) combined. Using an excessive amount of the film-forming ingredient may adversely affect the properties of the coating because a large amount of the film-forming ingredient is left in the coating even after the completion of curing.

Also in the preferred embodiment of the invention, a compound containing a Group IA and/or Group IIA element as a silanol condensation catalyst (C) is included in the overcoat composition (II).

Examples of the compound containing a Group IA and/or Group IIA element (C) include inorganic salts such as lithium hydroxide, sodium hydroxide, potassium hydroxide, cesium hydroxide, magnesium hydroxide, calcium hydroxide, barium hydroxide, sodium carbonate, potassium carbonate, magnesium carbonate, calcium carbonate, sodium hydrogen carbonate, potassium hydrogen carbonate, lithium chloride, sodium chloride, potassium chloride, cesium chloride, magnesium chloride, calcium chloride, barium chloride, sodium sulfate, potassium sulfate, magnesium sulfate, calcium sulfate, sodium hydrogen sulfate, and potassium hydrogen sulfate; organic acid salts such as lithium formate, sodium formate, potassium formate, cesium formate, magnesium formate, calcium formate, barium formate, lithium acetate, sodium acetate, potassium acetate, cesium acetate, magnesium acetate, calcium acetate, barium acetate, sodium oxalate, and potassium oxalate; alkoxides such as sodium methylate, potasium methylate, and sodium ethylate; and fluorides such as potassium fluoride and sodium fluoride. The condensation catalyst may be emulsified prior to use so that it becomes more water dispersible. Of the above examples, inorganic compounds are preferred for ease of operation and availability. Further, compounds containing an element selected from Li, Na, K and Cs are preferred because of their high activity as curing catalyst. Especially preferred are $NaHCO_3$, $Na_2CO_3$ or a buffered solution thereof having sodium acetate or potassium acetate added. The condensation catalyst may be added to the emulsion either directly or in a diluted form in water or solvent.

An appropriate amount of the compound containing a Group IA and/or Group IIA element (C) added is 0 to about 20 parts, more preferably about 0.01 to 20 parts, most preferably about 0.1 to 10 parts by weight per 100 parts by weight of the silanol group-bearing silicone resin (A-1) and radical polymerizable vinyl monomer (A-2) combined. A too small amount of the compound containing a Group IA and/or Group IIA element may fail to promote condensation whereas a too large amount may adversely affect the weather resistance, water resistance and outer appearance of the coating.

According to the invention, the overcoat composition (II) includes as a main component a silicone resin-containing emulsion composition containing the silicone resin-containing emulsion (A). In addition to component (A), the preferred composition further includes the film-forming ingredient having a boiling point of higher than 100° C. (B) and the compound containing a Group IA and/or Group IIA element (C).

The method of preparing the composition is not critical. When the film-forming ingredient (B) is added to the system, it may be added to either the polymerizable vinyl monomer solution of the silicone resin prior to polymerization or the emulsion following polymerization. To render the silicone resin-containing emulsion more stable, an acidic compound such as mineral acids or organic acids or a basic compound such as ammonia or inorganic bases is preferably added to the system so as to adjust to pH 3 to 9. In this regard, a combination of acids and/or basic compounds serving as a buffer agent for pH adjustment, for example, acetic acid combined with sodium acetate, disodium hydrogen phosphate combined with citric acid may also be added. Below pH 3 or above pH 9, the surfactant used for emulsion polymerization may become unstable or the condensation of silanol groups be promoted. The more preferred pH range is pH 4 to 8.

When the condensation catalyst (C) is added to the system, it may be added to either the polymerizable vinyl monomer solution of the silicone resin prior to polymerization or the emulsion following polymerization. In order for the condensation catalyst (compound containing a Group IA and/or Group IIA element) to exert the most active function, the emulsion composition in which the catalyst is incorporated is preferably maintained at pH 8 to 12. In this pH range, silanol groups form a salt with the Group IA or Group IIA element, which exhibits catalytic activity. It is then recommended to maintain the emulsion composition in this pH range.

Besides the above components (A) to (C), metal oxide microparticulates may be added to the silicone resin-containing emulsion composition for improving the hardness and mar resistance of the cured coating, imparting an optical function such as a higher refractive index and UV absorption (light resistance improvement) or antistatic purposes. Examples of the metal oxide include silica, alumina, titanium oxide ($TiO_2$), cerium oxide ($CeO_2$), tin oxide ($SnO_2$), zirconium oxide ($ZrO_2$), antimony oxide ($Sb_2O_5$), iron oxide ($Fe_2O_5$), zinc oxide (ZnO), silver- or zirconium oxide-doped titanium oxide, rare earth oxides, and mixtures thereof. The metal oxide is not limited to these examples. Silica is suited in the coating composition for the purpose of improving mar resistance.

In the coating composition, pigments consisting essentially of inorganic particles including extender pigments, colored pigments and anticorrosion pigments are preferably blended for further improving such functions as weather resistance, heat resistance and chemical resistance. Exemplary extender or anticorrosion pigments include titanium oxide, calcium carbonate, magnesium carbonate, barium sulfate, aluminum, clay, silica or silica flour, diatomaceous earth, talc, mica, kaolin, barite, aluminum hydroxide, zinc hydroxide, aluminum oxide, aluminum silicate, aluminum phosphate, and silica sol, alumina sol, magnesia sol, titania sol and zirconia sol of water or organic solvent (e.g., alcohols) dispersion type, which may be surface treated with silane coupling agents. Exemplary of the colored pigment are carbon black, graphite, ceramic black, zinc oxide, iron oxide, cadmium red, chromium oxide, cobalt green, Guignet's green, cobalt blue, phthalocyanine blue, Prussian blue, cadmium yellow and titanium yellow, which may be surface treated with silane coupling agents. Exemplary organic pigments are azo, azo chelate, phthalocyanine, quinacridone, isoindoline pigments. These pigments used herein must be acidic or neutral so that they do not adversely influence the emulsion stability. Use of basic pigments can cause the pH of the emulsion to change to an unstable range.

An appropriate amount of the pigment added is less than about 900 parts by weight, more preferably less than about 500 parts by weight per 100 parts by weight of the solids in the emulsion. Too large an amount of the pigment may negate the film-forming ability and prevent formation of a uniform coating.

In the coating composition, a water-soluble or dispersible type organic resin may be blended. The organic resin is used for the purpose of imparting flexibility, softness, adhesion, chemical resistance or other properties to the cured coating. Examples of the water-soluble or dispersible organic resin which can be added to the acrylic-silicone resin emulsion according to the invention include polyvinyl alcohol, water-soluble polyester resins, water-soluble or dispersible epoxy reins, water-soluble or dispersible acrylic reins, water-soluble or dispersible silicone-acrylic resins, and urethane resins. Additionally an isocyanate resin may be added as a crosslinking agent. An appropriate amount of the organic resin added is less than about 50 parts by weight, more preferably less than about 30 parts by weight per 100 parts by weight of the solids in the emulsion. Too large an amount of the organic resin may detract from heat resistance and weather resistance.

For the purpose of imparting good coating properties, there may be added any of conventional well-known agents as exemplified below. Examples include curing agents (as described above), dispersants, plasticizers, antifoaming agents, thickeners, leveling agents, preservatives, mildew-proofing agents, antioxidants, UV absorbers (e.g., benzophenone, triazole, phenyl salicylate, diphenyl acrylate, acetophenone types), hindered amine photostabilizers, and extenders (e.g., aluminum paste and glass frit).

The methods of applying and curing the undercoat composition and the overcoat composition are not critical. Any of conventional well-known coating and curing methods may be used. For example, the undercoat composition and the overcoat composition are applied by dipping, spraying, roll coating and brush coating techniques.

More illustratively, after application, the undercoat composition may be allowed to stand at room temperature for evaporating off water or heated for promoted drying. The build-up or coverage of the undercoat composition varies with the denseness and water absorption of substrate surface, the formulation of the undercoat composition, or the like although the build-up is usually about 0.05 to 500 g/m$^2$, preferably about 0.1 to 300 g/m$^2$ of solids.

In the embodiment wherein the overcoat composition is used in the uncured state as a protective coating, it suffices that the substrate coated with the overcoat composition be allowed to stand at room temperature for evaporating off water. Where the coating is to be converted to a high hardness one as a result of crosslinking driven by room temperature curing, the substrate coated with the overcoat composition having the condensation catalyst added thereto is allowed to stand at room temperature for 0.1 to 30 days whereupon a satisfactory cured film is obtained. Where the coating is to be converted to a high hardness one as a result of crosslinking driven by heat curing, the emulsion composition to which the condensation catalyst is optionally added is applied and heated at a temperature in the range of about 50 to 300° C. for about ½ minute to 200 hours. The thickness of the coating may be selected as appropriate although it is usually 0.01 to 100 μm, and especially 0.05 to 80 μm.

The coated article of the invention has improved properties including mar resistance, weather resistance and chemical resistance because the undercoat composition and the overcoat composition are sequentially applied and dried to form cured coatings on a surface of a transparent or opaque substrate to be protected, such as metal, ceramic, glass, wood, paper, and plastic substrates. Particularly when the substrate is made of an inorganic material, the coated article is useful in a wide variety of applications exposed to sunlight and weather where long-term durability is required, for example, exterior wall members of mortar, concrete and cement, ceramic panels, typically ALC boards, siding boards and gypsum boards, and brick, glass, porcelain, and artificial marble items.

The overcoat or topcoat formed of a silicone/acrylic emulsion composition according to the invention has the following advantages. (i) In emulsion particles, the silicone resin forms an interpenetrating polymer network (IPN) with the acrylic resin so that both the resins may complement their shortcomings. The emulsion has a good film-forming ability and provides a uniform cured coating having satisfactory properties including mar resistance, weather resistance, and chemical resistance. (ii) In emulsion particles, polymers are intertwined in a solventless state, restricting the freedom of silanol groups which have rich condensation activity. As a consequence, condensation of silanol groups is suppressed even in systems having a high content of silanol groups, contributing to storage stability. Since the silicone resin used are water insoluble, the silicone resin is completely incorporated in particles, so that a satisfactory level of stability is maintained. (iii) Since silanol groups are restrained within emulsion particles, they retain high crosslinking or curing activity until curing, achieving effective cure even at relatively low temperatures. (iv) Because of the substantial absence of solvent, a dry and fully cured coating is obtained. A sound working environment is insured since the volatilization of harmful solvent is eliminated. The emulsion is kept fully stable since it is free of an alcohol component that promotes-demulsification.

Since an undercoat of the specific composition is formed beneath the overcoat of the silicone/acrylic emulsion composition, the following advantage is obtained. (v) In the event of substrates having less active groups contributing to adhesion on the surface such as stainless steel and plastics, and porous substrates allowing water to penetrate therethrough such as slates, the interposition of the undercoat layer containing hydrolyzable silyl groups prevents swelling upon immersion in hot water, achieving a significant improvement in adhesion to the substrates.

The coated article having the undercoat and overcoat formed in sequence on the substrate is thus suited as structures and buildings where long-term durability is required and also applicable to a wide variety of uses where acrylic-silicone resins are conventionally employed.

EXAMPLE

Preparation Examples and Examples are given below together with Comparative Examples for illustrating the invention, but are not intended to limit the invention thereto. All percents and parts are by weight.

Preparation Example 1

A 2-liter flask was charged with 400 g of toluene and 177 g (1.0 mol) of γ-aminopropyltrimethoxysilane. In a nitrogen atmosphere, 472 g (2.0 mol) of γ-glycidoxypropyltrimethoxysilane was added dropwise to the flask over 30 minutes for reaction. After 30 minutes of mixing at room temperature, the reaction mixture was heated under reflux at 110° C. for 2 hours to bring the reaction to completion. The thus obtained solution was diluted with toluene, yielding an undercoat composition A having a nonvolatile content of 20%.

Preparation Example 2

An undercoat composition B having a nonvolatile content of 20% was obtained by following the procedure of Preparation Example 1 except that 146 g (0.67 mol) of N-(2-aminoethyl)aminopropyltrimethoxysilane was used instead of the γ-aminopropyltrimethoxysilane.

Preparation Example 3

A 1-liter flask was charged with 800 g of the undercoat composition A obtained in Preparation Example 1, from which the toluene was distilled off under vacuum. There was left a pale brown liquid having a nonvolatile content of 96%, to which sodium dodecylbenzenesulfonate as the emulsifier and water were added. By agitating with a high-speed agitator, the mixture was emulsified into an undercoat composition C having a nonvolatile content of 30%.

Preparation Example 4

A polymerizer equipped with an agitator, condenser, thermometer and nitrogen gas inlet was charged with 730 parts of deionized water, 0.47 part of sodium carbonate and 4.70 parts of boric acid as the pH buffering agent. With stirring, the polymerizer was heated to 60° C. before it was purged with nitrogen. To the mixture were added 1.75 parts of Rongalit, 0.12 part of a 1% aqueous solution of disodium ethylenediaminetetraacetate, and 0.04 part of a 1% aqueous solution of ferrous sulfate. At the same time, a mixture of 250 parts of methyl methacrylate, 400 parts of butyl acrylate, 50 parts of glycidyl methacrylate, 7 parts of γ-methacryloxypropyltrimethoxysilane, 2.1 parts of t-butylhydroperoxide (69% pure), 14.0 parts of reactive surfactant Aqualon RN-20 and 7.0 parts of Aqualon HS-10 (trade name, Daiichi Kogyo Seiyaku K.K.) was constantly added over 2.5 hours while the temperature within the polymerizer was maintained at 60° C. Reaction was continued at 60° C. for a further 2 hours to complete polymerization. To the reaction solution was added 40 parts of 2-butoxyethyl acetate. Thorough agitation and mixing gave an emulsion.

The emulsion had a solid concentration of 51.6%, and was adjusted to pH 7.0 by adding aqueous ammonia. This was diluted with water to a nonvolatile content of 30%. To 300 g of this dilution was added 17.8 g (0.082 mol) of N-(2-aminoethyl)aminopropyltrimethoxysilane. This was agitated for one hour at room temperature, obtaining an undercoat composition D.

Preparation Example 5

To 1,667 g of a commercially available epoxy resin (60% xylene solution, epoxy equivalent 460) was added 177 g (1.0 mol) of γ-aminopropyltrimethoxysilane. This was diluted with isobutyl acetate to a nonvolatile content of 30%. Two hours of agitation at room temperature gave an undercoat composition E.

Preparation Example 6

A 1-liter flask was charged with 760 g (5.0 mol) of tetramethoxysilane, 236 g (1.0 mol) of γ-glycidoxypropyltrimethoxysilane, and 300 g of methanol. To the flask, 90 g (5.0 mol) of 0.05N hydrochloric acid was added dropwise to partially hydrolyze methoxy groups. The solution was then heated at 70° C. for 2 hours to effect condensation. Then the methanol and residual alkoxysilane monomer were distilled off in vacuum, obtaining oligomers having an average degree of polymerization of about 6. The epoxy equivalent was 790. To 460 g of the oligomers, 44 g (0.20 mol) of N-(2-aminoethyl) aminopropyltrimethoxysilane was added. Two hours of agitation at room temperature gave an undercoat composition F.

Preparation Example 7

A polymerizer equipped with an agitator, condenser, thermometer and nitrogen gas inlet was charged with 730 parts of deionized water, 0.47 part of sodium carbonate and 4.70 parts of boric acid as the pH buffering agent. With stirring, the polymerizer was heated to 60° C. before it was purged with nitrogen. To the mixture were added 1.75 parts of Rongalit, 0.12 part of a 1% aqueous solution of disodium ethylenediaminetetraacetate, and 0.04 part of a 1% aqueous solution of ferrous sulfate. At the same time, a mixture of 300 parts of methyl methacrylate, 400 parts of butyl acrylate, 7 parts of γ-methacryloxypropyltrimethoxysilane, 2.1 parts of t-butylhydroperoxide (69% pure), 14.0 parts of reactive surfactant Aqualon RN-20 and 7.0 parts of Aqualon HS-10 (trade name, Daiichi Kogyo Seiyaku K.K.) was constantly added over 2.5 hours while the temperature within the polymerizer was maintained at 60° C. Reaction was continued at 60° C. for a further 2 hours to complete polymerization. To the reaction solution was added 40 parts of 2-butoxyethyl acetate. Thorough agitation and mixing gave an emulsion.

The emulsion had a solid concentration of 49.7%, and was adjusted to pH 7.0 by adding aqueous ammonia. This was diluted with water to a nonvolatile content of 30%, obtaining an undercoat composition G.

Preparation Example 8

An emulsion having a solid concentration of 48.3% was obtained by following the procedure of Preparation Example 7 except that γ-methacryloxypropyltrimethoxysilane was omitted. This was diluted with water to a nonvolatile content of 30%, obtaining an undercoat composition H.

Preparation Example 9

A commercially available epoxy resin base primer was diluted with xylene to a nonvolatile content of 20%, obtaining an undercoat composition I. It was confirmed by elemental analysis and NMR that the commercial primer was free of hydrolyzable silyl groups.

Preparation Example 10

A 2-liter flask was charged with 408 g (3.0 mol) of methyltrimethoxysilane. In a nitrogen atmosphere and at 0° C., 800 g of water was added to the silane, which was thoroughly mixed. To the mixture under ice cooling, 216 g of 0.05N aqueous hydrochloric acid was added dropwise over 40 minutes to effect hydrolysis. After the completion of dropwise addition, the solution was agitated below 10° C. for one hour, then at room temperature for 3 hours, completing hydrolytic reaction.

The methanol resulting from hydrolysis and water were distilled off in vacuum by heating at 70° C. and 60 Torr for one hour. There was obtained 1,136 g of a solution which was white turbid. The solution was allowed to stand for one day, during which it separated into two layers. The silicone resin which became water insoluble settled down.

A sample was taken from the white turbid solution, and the silicone resin which became water insoluble was separated from the aqueous layer by dissolving it in methyl isobutyl ketone. After drying, the silicone resin solution was subjected to solvent exchange and reaction with methyl Grignard reagent for quantitative determination of silanol groups. The content of silanol groups was 11.0% by weight based on the silicone resin. As a result of GPC analysis, the silicone resin had a number average molecular weight of $1.8 \times 10^3$.

The structure of the silanol group-bearing silicone resin thus obtained was determined by infrared absorption spectroscopy (IR) and nuclear magnetic resonanace spectroscopy ($^{29}$Si-NMR). After the solvent was removed by air drying, there was left a coating, which was analyzed by IR spectroscopy. A broad absorption peak around 3200 cm$^{-1}$ attributable to silanol groups was observed, but not an absorption peak near 2840 cm$^{-1}$ attributable to the stretching vibration of a carbon-to-hydrogen bond on methoxy group. As an alternative, an attempt was made to quantitate residual methoxy groups by distilling off according to the alkali cracking method. No methanol was detected, supporting the results of IR analysis. As a consequence, it was judged that methoxy groups were thoroughly hydrolyzed.

On $^{29}$Si-NMR analysis, the respective structures of T units shown below could be discriminated from a positional difference of chemical shift developed.

| | |
|---|---|
| T-1 unit: CH$_3$—Si—O$_{1/2}$—(OH)$_2$ | -46 to -48 ppm |
| T-2 unit: CH$_3$—Si—O$_{2/2}$—(OH)$_1$ | -54 to -58 ppm |
| T-3 unit: CH$_3$—Si—O$_{3/2}$ | -62 to -68 ppm |

On $^{29}$Si-NMR analysis, the silanol group-containing silicone resin was found to contain 2 molt of T-1 units, 42 molt of T-2 units, and 56 molt of T-3 units.

Based on these analytical results, the silicone resin is represented by the following average compositional formula.

$$(CH_3)_{1.0}Si(OH)_{0.44}O_{1.28}$$

A calculation from this compositional formula gives a silanol group content of 10.5% by weight, which is fully coincident with the found values.

Next, 210 g of methyl methacrylate (MMA) and 90 g of butyl acrylate (BA) were added to the aqueous solution whereupon the once settled silicone resin was dissolved therein and separated from the aqueous layer as the silicone resin-containing MMA/BA solution. To the thus separated solution, 500 g of water was added. The mixture was thoroughly agitated and mixed for 10 minutes and then allowed to stand whereupon the aqueous layer was separated. The methanol in the organic layer was quantitated by GC, detecting 0.2% by weight of methanol in the aqueous solution. There was finally obtained 505 g of the MMA/BA solution (A) having a nonvolatile content of 40.2% by weight (105° C./3 hr). The nonvolatile content measured herein was equal to the content of siloxane in the solution.

Preparation Example 11

The procedure of Preparation Example 10 was repeated except that a mixture of 388 g (2.85 mol) of methyltrimethoxysilane and 18 g (0.15 mol) of dimethyldimethoxysilane was used instead of the methyltrimethoxysilane, hydrolysis was effected using 400 g of water and 4 g of 1N aqueous acetic acid, and the silicone resin was separated from the aqueous layer using 110 g of MMA and 110 g of BA instead of 210 g of MMA and 90 g of BA.

The silanol group-containing silicone resin thus obtained was similarly analyzed, finding a T-2 unit content of 38 mol % and a number average molecular weight of 1.5×10$^3$. The silicone resin is represented by the following average compositional formula.

$$(CH_3)_{1.05}Si(OH)_{0.04}O_{1.28}$$

The silanol group content was 9.6% by weight.

There was finally obtained 411 g of the MMA/BA solution (B) having a nonvolatile content of 49.7% by weight (105° C./3 hr).

Preparation Example 12

A 5-liter flask was charged with 1,300 g of water, 200 g of acetone and 800 g of toluene. With stirring at room temperature, a mixture of 89.7 g (0.6 mol) of methyltrichlorosilane and 507.6 g (2.4 mol) of phenyltrichlorosilane was added dropwise over one hour to effect hydrolysis. By further agitating at 30° C. for 9 hours, hydrolysis was driven to completion. The solution was then allowed to stand whereupon the aqueous layer containing hydrochloric acid was separated off. Then a water washing procedure of adding 1 liter of water to the remaining organic layer, agitating for 10 minutes, holding the solution, and separating off the aqueous layer was repeated twice. From the resulting silicone resin solution, the organic solvent was distilled off in vacuum by heating at 50° C. and 50 Torr. There was obtained 329 g of a powdered silicone resin.

The silanol group-containing silicone resin was similarly analyzed, finding a T-1 unit content of 1 mol %, a T-2 unit content of 62 mol % and a number average molecular weight of 1.9×10$^3$. The silanol group content was 2.6% by weight. The silicone resin is represented by the following average compositional formula.

$$(C_6H_5)_{0.80}(CH_3)_{0.2}Si(OCH_3)_{0.07}(OH)_{0.40}O_{1.27}$$

To the silicone resin were added 200 g of methyl methacrylate (MMA) and 23 g of butyl acrylate (BA). There was finally obtained 552 g of the MMA/BA solution (C) having a nonvolatile content of 59.0% by weight (105° C./3 hr).

Preparation Example 13

A polymerizer equipped with an agitator, condenser, thermometer and nitrogen gas inlet was charged with 730 parts of deionized water, 0.47 part of sodium carbonate and 4.70 parts of boric acid as the pH buffering agent. With stirring, the polymerizer was heated to 60° C. before it was purged with nitrogen. To the mixture were added 1.75 parts of Rongalit, 0.12 part of a 1% aqueous solution of disodium ethylenediaminetetraacetate, and 0.04 part of a 1% aqueous solution of ferrous sulfate. At the same time, a mixture of 700 parts of the silicone resin-containing MMA/BA solution (A) obtained in Preparation Example 10, 7 parts of γ-methacryloxypropylmethyldimethoxysilane, 2.1 parts of t-butylhydroperoxide (69% pure), 14.0 parts of reactive surfactant Aqualon RN-20 and 7.0 parts of Aqualon HS-10 (trade name, Daiichi Kogyo Seiyaku K.K.) was constantly added over 2.5 hours while the temperature within the polymerizer was maintained at 60° C. Reaction was continued at 60° C. for a further 2 hours to complete polymerization. To the reaction solution was added 40 parts of 2-butoxyethyl acetate. Thorough agitation and mixing gave an emulsion (Em-1).

The emulsion (Em-1) had a solid concentration of 50.1%, and was adjusted to pH 7.0 by adding aqueous ammonia.

Preparation Example 14

A glass beaker was charged with 700 parts of the silicone resin-containing MMA/BA solution (B) obtained in Preparation Example 11, 7 parts of γ-methacryloxypropylmethyldimethoxysilane, 14.0 parts of reactive surfactant Aqualon .RN-20 and 7.0 parts of Aqualon HS-10 (trade name, Daiichi Kogyo Seiyaku K.K.), and 70 parts of 2-butoxyethyl acetate. The charge was converted into an emulsion by slowing adding 430 parts of deionized water thereto while agitating with a high-speed agitator.

A polymerizer equipped with an agitator, condenser, thermometer and nitrogen gas inlet was charged with 230 parts of deionized water, 0.47 part of sodium carbonate and 4.70 parts of boric acid as the pH buffering agent. With stirring, the polymerizer was heated to 60° C. before it was purged with nitrogen. To the mixture were added 1.75 parts of Rongalit, 0.12 part of a 1% aqueous solution of disodium ethylenediaminetetraacetate, and 0.04 part of a 1% aqueous solution of ferrous sulfate. At the same time, the above prepared emulsion was constantly added over 2.5 hours while the temperature within the polymerizer was maintained at 60° C. Reaction was continued at 60° C. for a further 2 hours to complete polymerization.

The emulsion (Em-2) had a solid concentration of 49.9%, and was adjusted to pH 8.0 by adding aqueous ammonia.

Preparation Example 15

An emulsion (Em-3) was synthesized by effecting emulsion polymerization as in Preparation Example 14 except that the silicone resin-containing MMA/BA solution (C) was used instead of the silicone resin-containing MMA/BA solution (B). This emulsion had a solid concentration of 49.2%, and was adjusted to pH 8.0 by adding aqueous ammonia.

Preparation Example 16

By adding 1,212 g of MMA and 808 g of BA to 505 g of the MMA/BA solution (A) obtained as formulated in Preparation Example 10, there was finally obtained 2,525 g of a MMA/BA solution (D) having a nonvolatile concentration of 8.1% by weight (105° C./3 hr).

Preparation Example 17

By adding 25 g of BA and 32 g of film-forming ingredient 2-butoxyethyl acetate to 300 g of a powdered silicone resin prepared as in Preparation Example 12, there was obtained 357 g of a silicone resin-containing BA solution (E).

Preparation Examples 18 and 19

An emulsion (Em-4 or 5) was obtained by effecting emulsion polymerization as in Preparation Example 14 except that the silicone resin-containing MMA/BA solution (D) or the silicone resin-containing BA solution (E) was used instead of the silicone resin-containing MMA/BA solution (B). The emulsion (Em-4) had a solid concentration of 48.8%, the emulsion (Em-5) had a solid concentration of 50.2%, and both were adjusted to pH 8.0 by adding aqueous ammonia.

Preparation Example 20

A 2-liter flask was charged with 408 g (3.0 mol) of methyltrimethoxysilane, 155 g of toluene and 10 g of methanesulfonic acid, which were thoroughly mixed at 25° C. in a nitrogen atmosphere. To the solution, 97 g of water was added dropwise over 40 minutes to effect hydrolysis. After the completion of dropwise addition, the solution was agitated at 25° C. for a further 3 hours to complete hydrolytic reaction. The solution was neutralized and allowed to stand, following which the aqueous layer was separated off. Then a water washing procedure of adding 1 liter of water to the remaining organic layer, agitating for 10 minutes, holding the solution, and separating off the aqueous layer was repeated twice. From the resulting silicone resin solution, the organic solvent was distilled off in vacuum by heating at 50° C. and 50 Torr. There was obtained 195 g of a powdered silicone resin.

The silanol group-containing silicone resin was similarly analyzed, finding a T-1 unit content of 1 mol %, a T-2 unit content of 27 mol %, a T-3 unit content of 72 mol %, and a number average molecular weight of $3.4 \times 10^3$. The silanol group content was 3.6% by weight. The silicone resin is represented by the following average compositional formula.

$$CH_3Si(OCH_3)_{0.15}(OH)_{0.15}O_{1.36}$$

To the silicone resin were added 127 g of methyl methacrylate (MMA) and 68 g of butyl acrylate (BA). There was finally obtained 390 g of the MMA/BA solution (F) having a nonvolatile content of 50.0% by weight (105° C./3 hr).

Preparation Example 21

An emulsion (Em-6) was synthesized by effecting emulsion polymerization as in Preparation Example 14 except that the silicone resin-containing MMA/BA solution (F) was used instead of the silicone resin-containing MMA/BA solution (B). This emulsion had a solid concentration of 48.2%, and was adjusted to pH 8.0 by adding aqueous ammonia.

Examples 1–7 and Comparative Examples 1–6

After an overcoat composition as shown in Table 1 was prepared, the undercoat composition and the overcoat composition in a combination as shown in Tables 2 and 3 were sequentially applied onto a substrate. The coatings were dried and cured under conditions as shown in Tables 2 and 3, obtaining coated articles of Examples 1–7 and Comparative Examples 1–6. It is noted that the white pigment paste in Table 1 was obtained by mixing 710 g of pigment grade titanium oxide, 217 g of water, 22 g of a dispersant, 48 g of propylene glycol and 3 g of an antifoaming agent and shaking the mixture in a paint shaker.

The coatings of the coated articles of Examples 1–7 and Comparative Examples 1–6 were examined for hot waterproof adhesion by the following procedure. The results are also shown in Tables 2 and 3.

Hot water-proof Adhesion

By repeating a test cycle including immersing the coated article in hot water at 60° C. for 2 hours, drying for 2 hours and examining coating adhesion by an adhesive tape peeling test, the number of cycles repeated until peeling was counted (durable cycles). The outer appearance of the coating at the end of the first cycle (initial) was evaluated according to the following criterion.

Initial Coating appearance

O: no crack or peel

X: cracked

Separately, the coatings of Examples 1–7 and Comparative Examples 1–6 were formed on aluminum plates and subjected to a weathering test (500 hours) using Metering Weatherometer by Suga Tester K.K. The outer appearance and gloss retentivity of the coating before and after the test were evaluated according to the following criteria. The results are also shown in Tables 2 and 3.

Coating appearance

The appearance of the coating after the test was evaluated in comparison with that before the test.

O: no crack or peel

X: cracked

Gloss Retentivity

The gloss was measured before and after the test using a gloss meter VG-2000 by Japan Denshoku Kogyo K.K. A gloss retentivity was computed according to the following equation.

Gloss retentivity (t)=(gloss of coating after est)/(gloss of initial coating)×100

TABLE 1

|  | Overcoat composition | | | | | |
|---|---|---|---|---|---|---|
|  | 1 | 2 | 3 | 4 | 5 | 6 |
| Emulsion | | | | | | |
| Em-1 | 100 | — | — | — | — | — |
| Em-2 | — | 100 | — | — | — | — |
| Em-3 | — | — | 100 | — | — | — |
| Em-4 | — | — | — | 100 | — | — |
| Em-5 | — | — | — | — | 100 | — |
| Em-6 | — | — | — | — | — | 100 |
| White pigment paste | 35 | 35 | 35 | 35 | 35 | 35 |
| Sodium hydrogen carbonate | 0.6 | 0.6 | 0.6 | 0.6 | 0.6 | 0.6 |

TABLE 2

|  | E1 | E2 | E3 | E4 | E5 | E6 | E7 |
|---|---|---|---|---|---|---|---|
| Substrate | Slate | Slate | ALC plate | ALC plate | Slate | Slate | Slate |
| Undercoat composition | A | B | C | D | E | F | G |
| Drying conditions | RT/1 hr | 10° C./1 hr | 150° C./2 min | RT/1 hr | RT/1 hr | RT/1 hr | RT/1 hr |
| Overcoat composition | ① | ② | ③ | ① | ② | ③ | ① |
| Curing conditions | 150° C./5 min | 150° C./5 min | 150° C./5 min | 150° C./5 min | 15° C./5 min | 150° C./5 min | 150° C./5 min |
| Hot water-proof adhesion | | | | | | | |
| Initial | ○ | ○ | ○ | ○ | ○ | ○ | ○ |
| Durable cycles | >10 | >10 | >10 | >10 | >10 | >10 | >10 |
| Weathering (500 hr) | | | | | | | |
| Coating appearance | ○ | ○ | ○ | ○ | ○ | ○ | ○ |
| Gloss retentivity | 86% | 82% | 89% | 88% | 76% | 86% | 80% |

TABLE 3

|  | CE1 | CE2 | CE3 | CE4 | CE5 | CE6 |
|---|---|---|---|---|---|---|
| Substrate | Slate | Slate | ALC plate | Slate | Slate | Slate |
| Undercoat composition | H | I | H | I | H | H |
| Drying conditions | RT/1 hr | 150° C./2 min | RT/1 hr | 10° C./1 hr | RT/1 hr | RT/1 hr |
| Overcoat composition | ④ | ⑤ | ① | ④ | ⑤ | ⑥ |
| Curing conditions | 150° C./5 min | 150° C./5 min | 150° C./5 min | 150° C./5 min | 150° C./5 min | 150° C./5 min |
| Hot water-proof adhesion | | | | | | |
| Initial | x | x | x | x | x | ○ |
| Durable cycles | 1 | 1 | 1 | 1 | 1 | 3 |
| Weathering (500 hr) | | | | | | |
| Coating appearance | x | x | x | x | x | x |
| Gloss retentivity | 21% | 88% | 72% | 18% | 77% | 73% |

Japanese Patent Application No. 2000-002873 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A coated article comprising a substrate, an undercoat and an overcoat sequentially applied onto the substrate, said undercoat being made of an undercoat composition comprising a compound having a hydrolyzable group-bearing silyl group represented by $SiX_{3-a}$ wherein X is a hydrolyzable group and "a" is equal to 0, 1 or 2, or a partial hydrolyzate thereof or both, said overcoat being based on a silicone resin-containing emulsion composition comprising a silicone resin-containing emulsion, said silicone resin-containing emulsion resulting from emulsion polymerization of a mixed solution containing (A-1) 100 parts by weight of a silanol group-bearing silicone resin comprising 30 to 100 mol % of structural units (T units) represented by the formula: $R^1$—$SiZ_3$, and based on the entire T units, 30 to 80 mol % of structural units (T-2 units) containing only one silanol group represented by the general formula: $R^1$—$Si(OH)Z'_2$, wherein $R^1$ is a substituted or unsubstituted monovalent hydrocarbon group, Z is a hydroxyl group, hydrolyzable group or siloxane residue, at least one of the Z groups being a siloxane residue, and Z' is a siloxane residue, said silicone resin having a number average molecular weight of at least 500, and (A-2) 10 to 1,000 parts by weight of a radical-polymerizable vinyl monomer.

2. The coated article of claim 1, wherein said compound having a hydrolyzable group-bearing silyl group is a compound bearing at least one secondary and/or tertiary amino group as an organic group attached to a silicon atom.

3. The coated article of claim 1, wherein said compound having a hydrolyzable group-bearing silyl group is a compound having in a molecule at least one nitrogen atom and bearing at least two groups represented by $SiX_{3-a}$ wherein X and "a" are as defined above.

4. The coated article of claim 1, wherein said undercoat composition contains as a main component a compound having a hydrolyzable group-bearing silyl group which is the reaction product of a compound having a primary and/or secondary amino group with a compound having an epoxy group.

5. The coated article of claim 4, wherein said undercoat composition contains as a main component a compound having a hydrolyzable group-bearing silyl group which is the reaction product of an organoxysilane having a primary and/or secondary amino group with an organoxysilane having an epoxy group.

6. The coated article of claim 1, wherein said undercoat composition contains as a main component a compound having a hydrolyzable group-bearing silyl group which is a vinyl polymer bearing in a molecule at least one group represented by $SiX_{3-a}$ wherein X and "a" are as defined above.

7. The coated article of claim 6, wherein said undercoat composition contains as a main component a compound having a hydrolyzable group-bearing silyl group that is a vinyl copolymer resulting from copolymerization of a mixture of vinyl polymerizable monomers containing 0.1 to 20% by weight of a vinyl polymerizable, functional group-bearing hydrolysable silane represented by the formula:

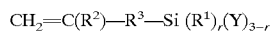

$$CH_2=C(R^2)—R^3—Si\ (R^1)_r(Y)_{3-r}$$

wherein $R^1$ is as defined above, $R^2$ is a hydrogen or methyl, $R^3$ is a divalent organic group, Y is a hydrolysable group, and r is equal to 0, 1 or 2.

8. The coated article of claim 1 wherein the hydrolyzable group represented by X is an alkoxy group of 1 to 3 carbon atoms.

9. The coated article of claim 1 wherein in the silanol group-bearing silicone resin (A-1), at least 50 mol % of the entire organic substituents on silicon atoms are methyl.

10. The coated article of claim 1 the radical-polymerizable vinyl monomer (A-2) contains 1 to 100 mol % of an alkyl (meth)acrylate whose alkyl moiety has 1 to 18 carbon atoms.

11. The coated article of claim 1 the radical-polymerizable vinyl monomer (A-2) contains 0.01 to 10 mol % of a vinyl polymerizable, functional group-bearing hydrolyzable silane represented by the formula:

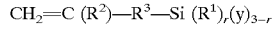

$$CH_2=C\ (R^2)—R^3—Si\ (R^1)_r(y)_{3-r}$$

wherein $R^1$ is as defined above, $R^2$ is hydrogen or methyl, $R^3$ is a divalent organic group, Y is a hydrolyzable group, and r is equal to 0, 1 or 2.

12. The coated article of claim 1 wherein in the overcoat, the silicone resin-containing emulsion is prepared by the steps of:

(i) hydrolyzing a hydrolyzable silane compound in an aqueous solution at pH 1 to 7, to form a reaction mixture containing a silanol group-bearing silicone resin, (ii) removing hydrolytic by-products from the reaction mixture and leaving a system essentially containing the silanol group-bearing silicone resin in water, (iii) adding a radical-polymerizable vinyl monomer to the system essentially containing the silanol group-bearing silicone resin in water and dissolving the monomer in the system, and removing a layer consisting of residual hydrolytic by-products and water, and (iv) emulsion polymerizing the resulting solution of the silicone resin in the radical-polymerizable vinyl monomer in the presence of a surfactant.

13. The coated article of claim 1 wherein said substrate comprises at least one selected from among metals, ceramic inorganic materials, glass, wood, paper and plastics.

* * * * *